United States Patent [19]

Bontemps et al.

[11] Patent Number: 5,382,638
[45] Date of Patent: Jan. 17, 1995

[54] APPARATUS FOR GAS PHASE POLYMERIZATION OF OLEFINS IN A FLUIDIZED BED REACTOR

[75] Inventors: Xavier Bontemps; Laszlo Havas; Andre Martens, all of Martigues; Frederic R. M. M. Morterol, Sausset-Les-Pin, all of France

[73] Assignee: BP Chemicals Limited, London, England

[21] Appl. No.: 832,688

[22] Filed: Feb. 7, 1992

Related U.S. Application Data

[63] Continuation of Ser. No. 470,174, Jan. 25, 1990, abandoned.

[30] Foreign Application Priority Data

Jan. 31, 1989 [FR] France .................. 89 01378

[51] Int. Cl.$^6$ ............................................. C08F 2/34
[52] U.S. Cl. ................................. 526/67; 526/68; 526/88; 526/901; 422/144; 422/145
[58] Field of Search .............. 422/144, 145; 526/67, 526/68, 88, 901

[56] References Cited

U.S. PATENT DOCUMENTS

| | | | |
|---|---|---|---|
| 2,446,247 | 9/1948 | Scheineman | 422/144 |
| 2,463,912 | 3/1949 | Scharmann | 422/144 |
| 2,586,818 | 2/1952 | Harms | 422/145 |
| 2,654,699 | 10/1953 | Lesher | 422/145 |
| 3,607,062 | 9/1971 | Sudduth | 422/145 |
| 4,003,712 | 1/1977 | Miller | 526/68 |
| 4,427,573 | 1/1984 | Miles et al. | 526/125 |
| 4,430,300 | 2/1984 | Vickers | 422/144 |
| 4,640,963 | 2/1987 | Kreider et al. | 526/67 |
| 4,882,400 | 11/1989 | Dumain et al. | 526/88 |
| 5,019,353 | 5/1991 | Harandi et al. | 422/145 |
| 5,171,541 | 12/1992 | Raufast | 422/145 |

FOREIGN PATENT DOCUMENTS

| | | |
|---|---|---|
| 0071430 | 2/1983 | European Pat. Off. . |
| 0175532 | 3/1986 | European Pat. Off. . |
| 0250169 | 12/1987 | European Pat. Off. . |
| 0301872 | 2/1989 | European Pat. Off. . |
| 150305 | 6/1988 | Japan . |
| 59126406 | 7/1984 | Taiwan, Prov. of China . |

OTHER PUBLICATIONS

"The Fundamentals of the Fluidisation Practice", N. I. Galperin, et al., Khimiya Publishers, Moscow, 1967, p. 457. (English Translation).
"Adjustment of Pneumatic Devices at Grain-Processing Enterprises", A. I. Krivoshein, Kolos Publishers, 1972 pp. 5-14 (English Translation).

Primary Examiner—Joseph L. Schofer
Assistant Examiner—Tom Weber
Attorney, Agent, or Firm—Brooks Haidt Haffner & Delahunty

[57] ABSTRACT

A process for polymerizing olefins in a gas-phase fluidized-bed reactor comprising a reactor body (1), optionally surmounted by a disengagement chamber (2), in which fine particles entrained by the gas mixture leaving the top of the reactor are separated from the gas and recycled to the upper portion of the reactor body. Polymer is withdrawn from the reactor body (1) via at least two polymer outlets, at least one of which (15) is in the lower portion of the reactor body (1) and at least one of which (16) is in the upper portion of the reactor body at a position below the top of the fluidized bed. The invention includes apparatus for polymerizing olefins and the use of the apparatus.

19 Claims, 2 Drawing Sheets

APPARATUS FOR GAS PHASE POLYMERIZATION OF OLEFINS IN A FLUIDIZED BED REACTOR

This application is a continuation of application Ser. No. 07/470,174, filed Jan. 25, 1990 now abandoned.

The present invention relates to an apparatus and a process for the gas-phase polymerization of olefins in a fluidized-bed reactor.

It is known to polymerize one or more olefins from a gaseous reaction mixture containing the olefin(s) to be polymerized in a fluidized-bed reactor, where the polymer particles being formed are kept in the fluidized state above a fluidization grid, by means of the gaseous reaction mixture moving in an ascending stream. The polymer produced is generally withdrawn from the reactor via a discharge conduit arranged in the lower portion of the reactor, near the fluidization grid. The gaseous mixture leaving the top of the fluidized-bed reactor is recycled to the base of the latter by means of a recycle line and a compressor. While being thus recycled, the gaseous mixture is in most cases cooled with the aid of a heat exchanger, so as to remove the heat produced during the polymerization reaction. The polymerization reaction may be carried out in the presence of a catalyst system of the Ziegler-Natta type, consisting of a solid catalyst essentially comprising a compound of a transition metal and of a cocatalyst comprising an organic compound of a light metal. High-activity catalyst systems have already been known for a number of years and are capable of producing large quantities of polymer in a relatively short time, and thus make it possible to avoid a step of removing catalyst residues from the polymer. These high-activity catalyst systems generally comprise a solid catalyst consisting essentially of atoms of transition metal, of magnesium and of halogen. It is also possible to use a high-activity catalyst consisting essentially of a chromium oxide activated by a heat treatment and associated with a granular support based on a refractory oxide.

A problem with gas-phase fluidized bed reactors is that a relatively large quantity of fine particles of polymer and of catalyst is entrained by the gaseous reaction mixture out of the fluidized-bed and out of the reactor. Some of the fine particles leaving the fluidized-bed can be returned to the bed before they leave the reactor itself by the use of a disengagement chamber above the reactor body. Such a disengagement chamber has a cross-section which is larger than that of the reactor body so that the flow rate of the gaseous reaction mixture through the disengagement chamber is substantially less than that through the reactor body. However, in order to avoid, or at least mitigate, fouling of the heat exchangers and premature wear of the compressor, the gaseous mixture leaving the top of the fluidized-bed reactor can be passed through a dust separator, such as for example one or more cyclones, to separate the fine particles from the major part of the gaseous mixture. Since the particles to be separated are very small, it can be difficult to extract them from the dust separator. The fine particles removed in a dust separator are preferably returned to the reactor.

Japanese patent application 57-128 706 discloses a process for gas-phase polymerization of olefins wherein the gas mixture leaving via the top of the fluidized-bed reactor which contains polymer in the form of fine particles is fed to a cyclone in which the gas and particles are separated. The particles are removed from the bottom of the cyclone by suction, e.g. by using an ejector-compressor, and recycled to the reactor in a stream of carrier gas.

French patent application 2 137 441 discloses a process for gas-phase polymerization of olefins in a fluidized-bed reactor in which the gas mixture leaving the top of the reactor which contains particles of polymer and catalyst is fed to a cyclone to separate the particles from the gas. The particles are recovered from the bottom of the cyclone using a suction device e.g. an ejector-compressor and are then recycled back to the reactor.

If the fine particles and carrier gas are recycled to the lower portion of the fluidized bed, the carrier gas must normally undergo an additional compression to avoid the blocking of the reintroduction conduit for recycling the fine particles. However, if, for reasons of economy, an additional compression is to be avoided, the fine particles can be recycled into the upper portion of the fluidized bed. In this case the flow rate of the fine particles circulating through the dust separator and means for recycling the fine particles increases and the risk of blocking the said means can become significant. Furthermore, the fine particles which fly off above the fluidized bed can be deposited in relatively large quantities on the walls of the reactor above the bed and can agglomerate into a thick layer, especially in the reactor's disengagement chamber, when it has one. The deposited particles can then form solid slabs which, beyond a certain weight, can become separated from the walls, fall into the fluidized bed and seriously disturb the polymerization reaction. Such problems can arise especially when high-activity catalysts are employed, in particular catalysts of the Ziegler-Natta type, based on a transition metal, halogen and magnesium.

The present invention overcomes, or at least mitigates, the problems associated with the fine particles entrained out of the fluidized bed with the gaseous mixture in a gas-phase fluidized-bed polymerization reactor. In particular, the flow rate of fine particles leaving the reactor can be reduced and the risk of blocking the dust separator and/or the means for recycling the fine particles to the reactor can be reduced. The quantity of fine particles deposited on the walls of the reactor above the fluidized-bed can be reduced. Also, it is possible to operate the reactor with a higher velocity for the fluidizing gas mixture which can result in an increase in the production efficiency of the polymerization.

Thus, according to the present invention, apparatus for polymerizing olefins in a gas-phase fluidized-bed comprises (A) a gas-phase fluidized-bed reactor comprising a reactor body (1) having a fluidization grid (3) arranged in its base, the reactor body having a height above the fluidization grid (3) of H, (B) means for recycling gas from the top of the fluidized bed reactor to the base of the reactor body (1), below the fluidization grid (3) comprising a dust separator (5), a heat exchanger (6,8) and a compressor (7) and (C) means for recycling fine particles from the dust separator (5) to the reactor body (1)

and is characterized in that (D) the means for recycling the fine particles returns the fine particles to a position in the upper portion of the reactor body (1)

and in that (E) the reactor body has two or more polymer outlets, at least one lower polymer outlet (15) is in the lower portion of the reactor body (1) and at least one upper polymer outlet (16) is in the upper portion of the reactor body (1) at a position which when the reactor is in use is below the top of the fluidized bed.

The present invention includes a process for gas-phase polymerization of one or more olefins in the presence of a solid catalyst based on chromium oxide, activated by heat treatment, or a catalyst system of the Ziegler-Natta type in which process a rising stream of a gas mixture containing the olefin(s) to be polymerized keeps the polyolefin particles being formed in the fluidized state in a fluidized-bed reactor comprising a reactor body (1) partially occupied by the fluidized-bed, the gas mixture leaving the fluidized-bed reactor entrains fine particles which are separated from the gas mixture in a dust separator and are recycled to the reactor body (1), the gas mixture being then cooled, compressed and recycled to the base of the reactor, and forming the recycle gas, the process being characterised in that (A) the fine particles separated in the dust separator (5) from the major part of the gas mixture leaving the reactor are recycled to the reactor body (1) and introduced to the upper portion of the reactor body (1)

and in that (B) the polymer produced is withdrawn from the reactor via at least two polymer outlets, at least one of which (15) is in the lower portion of the reactor body (1) and at least one of which (16) is in the upper portion of the reactor body (1) at a position below the top of the fluidized-bed.

The apparatus and process will be described with reference to the accompanying drawings.

FIG. 1 illustrates a gas-phase fluidized-bed reactor consisting essentially of a reactor body (1), which is generally an upright cylinder, having a fluidization grid (3) in its base. The reactor body (1) has a height above the fluidization grid (3) of H.

Figure 1:
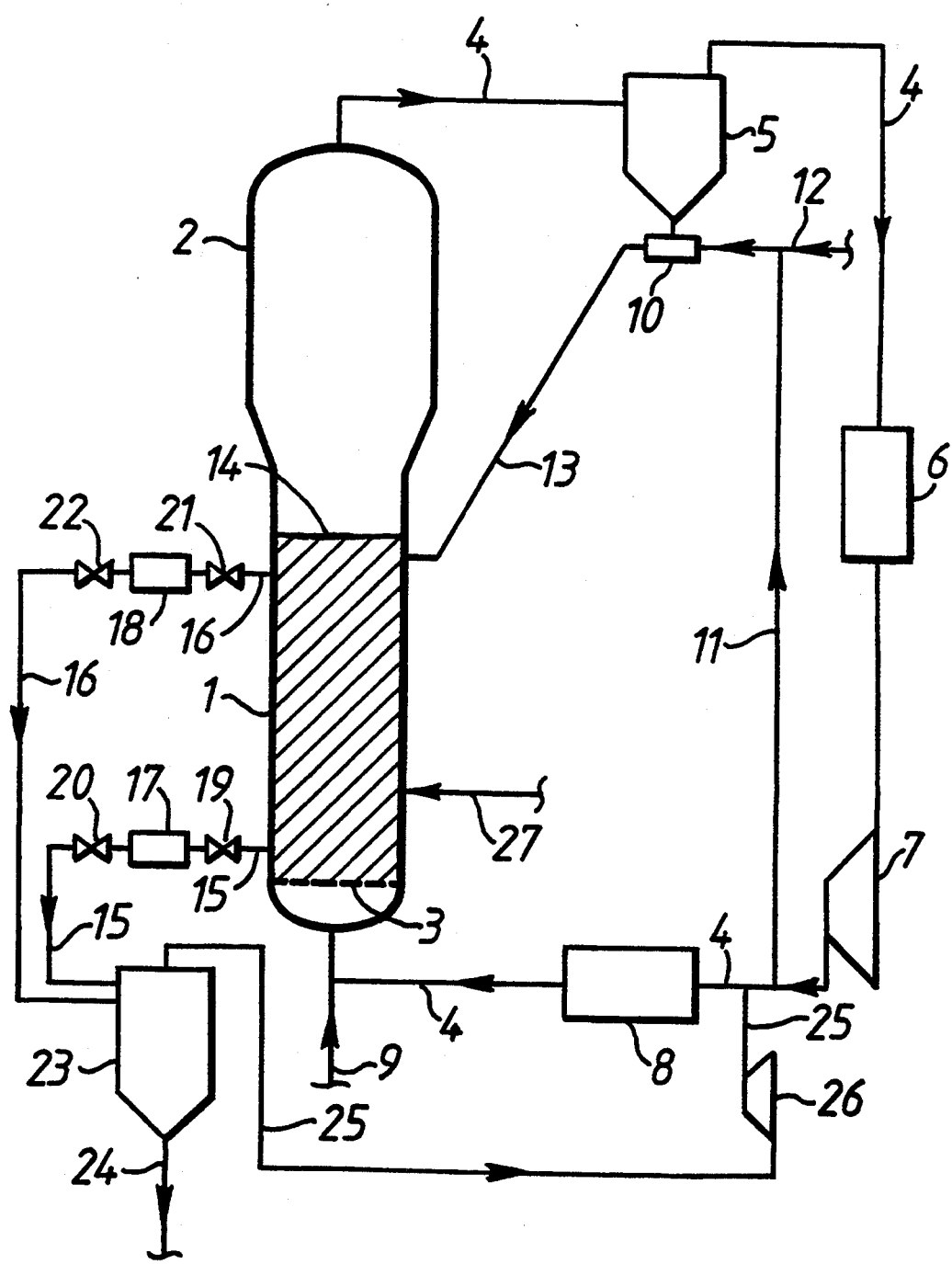
FIG. 1 shows diagrammatically apparatus for the gas-phase polymerization of olefins according to the present invention.

The reactor body (1) is surmounted by an optional, but preferred, disengagement chamber (2), which has a cross-section which is larger than that of the reactor body (1). The disengagement chamber can be of any suitable shape. The disengagement chamber (2) illustrated in FIG. 1 comprises a cylinder of larger diameter than the cylinder of the reactor body (1), connected to the reactor body by a section having the form of a frustum of a cone and having a dome-shaped roof which can be hemispherical. The disengagement chamber may also, for example, take the form of a bulb, consisting of the frustum of a cone, the small base being connected to the reactor body (1) and the large base being connected to a dome-shaped roof which can be hemispherical.

When the fluidized-bed reactor is in use, the reactor body (1), is partially occupied by a fluidized bed comprising particles of catalyst and polymer. The bed has a height h, measured from the fluidization grid (3) to the top of the bed (14) and the ratio of the height of the bed h to the height of the reactor body H is generally from 0.7 to 0.95, preferably 0.75 to 0.9. In the zone of the upper portion of the reactor body (1) which is not occupied by the fluidized-bed, spattering of solid particles takes place as the bubbles of the gas mixture passing through the fluidized-bed burst at the surface at the top of the bed. The height of this zone is preferably such that entrainment of solid particles out of the reactor body is minimised. When a disengagement chamber is used, it is particularly important to minimise the amount of spattering particles reaching the disengagement chamber (2). The operation of the disengagement chamber could be disturbed by particles spattering into the chamber.

The essential function of a disengagement chamber (2) is to slow down the ascending gas stream which, after having passed through the fluidized-bed, can contain relatively large quantities of solid particles. As a result of this velocity reduction, most of the entrained solid particles return directly to the fluidized bed. Only the finest particles are entrained out of the reactor.

The gaseous reaction mixture leaving the top of the fluidized-bed reactor is recycled to the base of the reactor under the fluidization grid (3) via an external recycle conduit (4) which is provided with a dust separator (5), at least one compressor (7) and at least one heat exchanger (6,8). In FIG. 1, two heat exchangers are shown, one before (6) and one after (8) the compressor (7). The heat exchangers cool the recycle gas to remove the heat of polymerization and thereby maintain a relatively constant temperature in the fluidized bed.

Make-up of constituents of the gaseous reaction mixture consumed or lost during the process can be introduced into the recycle conduit as shown, for example, by the line (9) in FIG. 1.

The dust separator (5) illustrated in FIG. 1 is a cyclone. Other dust separators can be used such as for example a filter or an apparatus containing baffles. More than one dust separator may be used in parallel or in series. The dust separator is generally situated upstream of the compressor (7) in order to reduce wear of the latter. The particles separated from the gas mixture leaving the reactor are recycled to a position in the upper portion of the reactor body (1). The means for recycling the fine particles from the dust separator (5) to the reactor body (1) illustrated in FIG. 1 comprises a mixing device (10) capable of withdrawing the fine particles from the dust separator (5), mixing them with a carrier gas and recycling the mixture of carrier gas and fine particles to the reactor body (1) via a reintroductin conduit (13). The function of the mixing device (10) is to bring the fine particles collected in the dust separator (5) into contact with the carrier gas which is intended to convey these particles substantially uniformly diluted in the gas stream. The mixing device (10) is preferably situated immediately below the lower part of the dust separator (5). It can consist of an ejector-compressor comprising a converging section, that is to say a portion of decreasing cross-section into which the carrier gas is introduced, a mixing chamber connected to the particle exit orifice of the dust separator (5), and a diverging section, that is to say a portion of increasing cross-section, into which the carrier gas entrains the fine particles.

The carrier gas must not be a poison or contain a poison for for the polymerization reaction. It may contain or consist of gas which is inert towards the catalyst or the catalyst system employed during the polymerization reaction, especially nitrogen. It may also comprise wholly or in part the olefin(s) which must be introduced into the reactor to compensate for the quantity consumed by the polymerization reaction. In order to avoid introducing into the reactor excessively large quantities of inert gas the carrier gas preferably comprises the gas mixture fed to the fluidized-bed or forming the recycle gas. FIG. 1 shows how, in practice, the recycle gas may be used as the carrier gas. A fraction of the recycle gas consisting of the gas mixture leaving the reactor, freed from the solid particles and compressed in order to compensate for the pressure drops in the circuit is removed from the recycle line (4) via conduit (11). If necessary, one or more of the constituents may be replenished by introducing them into the conduit (11) via line 12. The carrier gas does not need to be subjected to an additional compression step since the fine particles are reintroduced into the upper portion of the reactor body (1).

Figure 2:
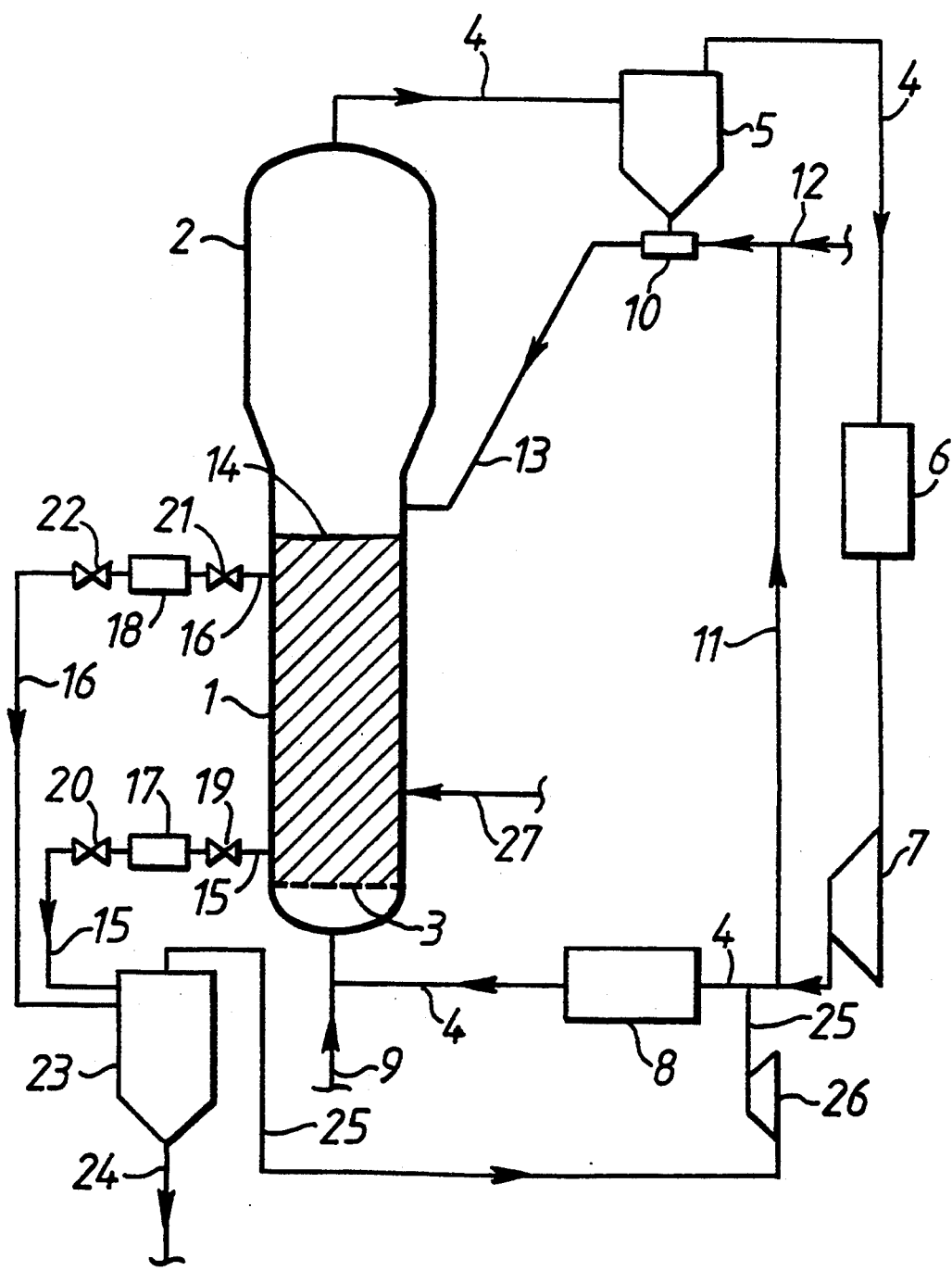
FIG. 2 shows diagrammatically apparatus for the gas-phase polymerization of olefins which is the same as that illustrated in FIG. 1 except that the reintroduction conduit (13) recycles the fine particles to a different position in the reactor.

The mixing device (10) is connected to the reactor body (1) of the fluidized-bed reactor via a reintroduction conduit (13). According to the present invention, the reintroduction conduit (13) opens out into the upper portion of the reactor body (1) of the fluidized-bed reactor. Generally the reintroduction conduit (13) opens out into the reactor body (1) at a height above the fluidization grid (3) which is higher than $0.5 \times H$, preferably equal to or higher than $0.65 \times H$, more particularly equal to or higher than $0.7 \times H$, but in all cases at a height lower than H. The reintroduction conduit (13) preferably opens into the side wall of the reactor body (1) of the reactor. According to FIG. 1, it opens at a height lower than the height h of the top of the fluidized bed (14), that is to say within the fluidized bed. According to an alternative embodiment shown in FIG. 2, the reintroduction conduit (13) opens into the reactor body (1) at a height higher than height h of the top of the fluidized bed (14), but at a height lower than H, that is to say into a region above the fluidized bed, where an intense circulation of powder takes place because of the ejection from the bed of particles due to the bursting of the bubbles at the surface of the fluidized bed.

The fluidized bed reactor has at least two polymer outlets for withdrawing polymer product. At least one lower polymer outlet (15) is positioned at a point situated in the lower portion of the reactor body (1). Generally, the lower polymer outlet (15) is positioned at a point having a height above the fluidization grid (3) which is lower than $0.5 \times H$, preferably equal to or lower than $0.3 \times H$, more preferably equal to or lower than $0.2 \times H$. At least one upper polymer outlet (16) is positioned at a point situated in the upper portion of the reactor body (1). Generally, the upper polymer outlet (16) is positioned at a point having a height above the fluidization grid (3) which is higher than $0.5 \times H$, preferably equal to or higher than $0.65 \times H$, more preferably equal to or higher than $0.7 \times H$. It will be appreciated that to be effective, the upper polymer outlet (16) must be at a height lower than the height h of the top of the fluidized bed (14) when the reactor is in use. Typically, the lower polymer outlet (15) and the upper polymer outlet (16) are separted by a height of at least H/3, preferably at least H/2.

The point at which the reintroduction conduit (13) opens into the reactor body (1), to return the fine solids to the reactor, and the point at which the upper polymer outlet (16) is positioned can be in any relationship to each other. However, it is recommended that the difference in the heights above the fluidization grid (3) of the points at which these two conduits open into the reactor body should be as small as possible, typically less than H/3, preferably no greater than H/4. Good results are obtained when the entrance of the reintroduction conduit (13) and the exit of the upper polymer outlet (16) are circumferentially separated but at substantially the same height above the fluidization grid (3). Good results are also obtained when the entrance of the reintroduction conduit (13) is positioned directly below the upper polymer outlet (16) i.e. they are at different heights above the fluidization grid (3) but are not significantly circumferentially separated.

The polymer outlets (15,16) can be equipped with apparatus for discharging the polymer, such as that described in French Patent Application No. 2,599, 991. The lower polymer outlet (15) can for example, be equipped with a gas lock (17) and with two stop valves (19, 20) which allow the gas lock (17) to be isolated. Similarly, the upper polymer outlet (16) can be equipped with a gas lock (18) and with two stop valves (21,22) intended to isolate the gas lock (18).

The volume of each of the gas locks (17,18) can be between 1/100 and 1/1000 of the volume of the fluidized solid contained in the reactor. The stop valves (19, 20, 21 and 22) may be stop valves with a spherical body and may be driven in a continuous rotary motion. The stop valves (19) and (20) are driven so that they are not, even partially, open at the same time. The same applies to the stop valves (21) and (22).

The polymer outlets (15,16) can discharge to the same receiver (23) intended to decompress the mixture of gas and of polymer discharged from the reactor through the gas locks (17) and (18). The receiver (23) may also separate the polymer from a part of the gaseous reaction mixture. The latter may be recycled into the recycle conduit (4) by means of a conduit (25) and of a compressor (26). During this time the polymer is recovered in the lower part of the receiver (23) and is discharged via a conduit (24).

The catalyst is introduced into the reactor via an entry conduit (27) which can open into the lower portion of the cylinder (1), preferably near the fluidization grid (3).

The present invention includes a process making use of the polymerization apparatus described above. In particular, the apparatus can be used in a process for gas-phase polymerization of one or more olefins containing from 2 to 8 carbon atoms, in the presence of a catalyst based on chromium oxide activated by a heat treatment, or of a catalyst system of the Ziegler-Natta type comprising, for example, a solid catalyst consisting essentially of atoms of magnesium, of halogen and of at least one transition metal belonging to groups IV, V or VI of the Periodic Classification of the elements and a cocatalyst based on an organometallic compound of a metal belonging to groups II or III of this Classification. The catalyst may be converted beforehand into the form of a prepolymer such as described in French Patent No. 2,405,961 or French Patent No. 2,570,381. The process is particularly suitable for the polymerization or the copolymerization of ethylene or of propylene, at a pressure of between 0.5 and 5 MPa, and at a temperature which is at least 5° C., preferably at least 10° C., lower than the melting temperature of the polymer, generally at a polymerization temperature of between 30° and 115° C.

The gaseous reaction mixture can consist of one or more olefins, optionally of diene, of hydrogen and of an inert gas such as nitrogen or a saturated hydrocarbon containing from 1 to 7 carbon atoms. Typically, the gaseous reaction mixture moves through the reactor body (1) of the reactor with an upward velocity of between 30 and 80 cm/s. The catalyst is introduced into the reactor continuously or intermittently via the conduit (27).

The carrier gas which moves through the mixing device (10) and in the reintroduction conduit (13) for recycling the fine particles preferably consists of the gaseous reaction mixture, which may be taken via the conduit (11) from the recycle conduit (4), preferably downstream of the compressor (7), in order to have the benefit of a sufficient compression for recycling the fine particles into the reactor. The carrier gas does not need to be subjected to an additional compression, since the fine particles are reintroduced into the upper portion of the reactor body (1). This results in a saving of energy in the compression of the carrier gas.

In the reintroduction conduit (13) for recycling the fine particles, the carrier gas can have a velocity of between 5 and 30 m/s. The carrier gas preferably has a temperature which is at least 15° C. lower than the polymerization temperature in the reactor.

The polymer produced can be withdrawn from the reactor via upper and lower polymer outlets (15,16) in such quantities that the ratio of the flow rates of polymer withdrawn via the lower polymer outlets (15) and the upper polymer outlets (16) is between 10/90 and 90/10, preferably between 30/70 and 70/30. The polymer may be withdrawn from the reactor intermittently in the course of time, in particular according to a cycle of operations which applies similarly to the discharge apparatus connected to each of the polymer outlets (15,16).

The discharge apparatus associated with the lower polymer outlet (15) can be operated by opening stop valve (19) so that the gas lock (17) fills with polymer and associated reaction gases from the reactor, closing stop valve (19) and the opening stop valve (20) in order to discharge the polymer and reaction gases from the gas lock (17) into the receiver (23), stop valve (20) is then closed before repeating the cycle. If the stop valves (19,20) are rotary stop valves, they can be rotated continuously in order to achieve the cycle described above. It is important however, that at no time should the valves (19 and 20) be open, even partially, at the same time. The discharge apparatus associated with the upper polymer outlet (16) can be operated in the same manner using the gas lock (18) and stop valves (21 and 22). The cycles of the discharge apparatus associated with the lower polymer outlet (15) can be in phase with those of the discharge apparatus associated with the upper polymer outlet (16), i.e. valves 20 and 22 open and close at the same time, or the steps can be time shifted so that cycles are out of phase e.g. valve 20 is open when valve 21 is open.

The discharge devices operate satisfactorily even when the pressure difference between the reactor (1) and the polymer receiver (23) is low. This pressure difference is generally between 0.1 MPa and 5 MPa, in most cases between 1 and 3 MPa.

The polymerization apparatus of the present invention and the process for making use of it offer major advantages. They make it possible to reduce considerably the flow rate of fine particles moving in the recycle conduit (13) and to avoid blockages in the region of the dust separator (5) and of the mixing device (10). They also make it possible to reduce markedly the quantity of fine particles which are deposited on the walls of the upper part of the reactor. Furthermore, another particularly important advantage is that it is possible to increase the fluidization velocity in the reactor and consequently the production efficiency of the polymerization apparatus by 15 to 20%, without producing detrimental effects.

The following examples illustrate the present invention.

EXAMPLE 1

The operation is carried out in a polymerization apparatus substantially as shown diagrammatically in FIG. 1, the fluidized-bed reactor consisting essentially of a reactor body (1) which is an upright cylinder which has a diameter of 3 m having at its base a fluidization grid (3). The reactor body has a height H above the fluidization grid (3) of 10.5 m and is surmounted by a disengagement chamber (2). The reactor body (1) contains a fluidized bed maintained at a substantially constant height h of 8.5 m above the fluidization grid (3) and consisting of a copolymer of ethylene and of 1-butene (relative density 0.918), in the form of a powder consisting of particles with a mass average diameter of 0.7 mm.

The reintroduction conduit (13) for recycling the fine particles opens into the reactor body (1) at a height of 8 m above the fluidization grid (3).

The lower polymer outlet (15) is positioned at a height of 1.5 m above the fluidization grid (3). The upper polymer outlet (16) is positioned at a height of 6 m above the fluidization grid (3).

A copolymerization of ethylene and 1-butene is carried out at a temperature of 80° C. in the presence of a gaseous reaction mixture containing 31% of ethylene, 13% of 1-butene, 6% of hydrogen and 50% of nitrogen, by volume, at a total pressure of 2 MPa and with a fluidization velocity of 0.55 m/s in the reactor body (1).

Catalyst is fed to the reactor body (1) via a conduit (27) which is 1.5 m above the fluidization grid (3). The catalyst is a solid catalyst based on titanium, chlorine and magnesium, as described in Example 1 of French Patent No. 2,405,961, a catalyst which has been converted into a prepolymer containing 40 g of polyethylene per millimole of titanium and a quantity of tri-n-octylaluminium in an Al/Ti molar ratio of 0.85. The rate of introduction of the prepolymer is 50 kg/h.

During the copolymerization 2.5 tonnes of copolymer per hour are withdrawn via the lower polymer outlet (15) and an equal quantity via the upper polymer outlet (16).

The fine particles separated by the cyclone (5) are reintroduced into the reactor via the ejector-compressor (10) and the reintroduction conduit (13) in which the gaseous reaction mixture is at a temperature of 55° C. and flows at a velocity of 12 m/s. The flow rate of fine particles reintroduced via the recycle conduit (13) into the reactor is 130 kg/h. Most of the fine particles are approximately 125 microns in size. No major formation of polymer agglomerates in the bed is observed.

EXAMPLE 2 (Comparative)

The operation is carried out in a polymerization apparatus identical with that employed in Example 1, except for the fact that polymer is not withdrawn via the upper polymer outlet (16). A copolymerization of ethylene and 1-butene is carried out under conditions which are otherwise identical with those of Example 1, except for the fact that 5 tonnes of copolymer per hour are withdrawn via the single lower discharge conduit (15).

It is observed that the flow rate of fine particles reintroduced via the recycle conduit (13) into the reactor is 280 kg/h and that polymer agglomerates appear in the fluidized bed in a relatively large quantity during the copolymerization.

EXAMPLE 3 the operation is carried out in a polymerization apparatus identical with that described in Example 1, except for the fact that the upper polymer outlet (16) leaves the cylinder (1) at a height of 8 m above the fluidization grid (3) and that the reintroduction conduit (13) opens into the cylinder (1) at a height of 7 m above the fluidization grid (3), directly below the upper polymer outlet (16). A copolymerization of ethylene and 1-butene is carried out under conditions which are otherwise identical with those of Example 1. 2.5 tonnes of copolymer per hour are withdrawn via the lower polymer outlet (15) and the same quantity via the upper polymer outlet (16).

It is observed that the flow rate of fine particles reintroduced via the recycle conduit (13) into the reactor is from 40 to 50 kg/h. No formation of polymer agglomerates in the bed is observed.

We claim:

1. In fluid bed reactor apparatus for polymerizing olefins in a gas-phase fluidized-bed comprising:
   (A) a gas-phase fluidized-bed reactor comprising an upright reactor body (1) having a fluidization grid (3) arranged in its base, a catalyst bed above said grid and comprising an olefin polymerization catalyst, means for supplying an olefin containing gas to said reactor body below said grid for maintaining said bed thereabove fluidized with the base of the bed at the elevation of said fluidization grid (3) and with the top (14) of said bed at an elevation above and spaced from said fluidization grid (3) when said reactor is in use, said reactor body extending vertically above said fluidization grid (3) and having a height above the fluidization grid (3) of H, means for supplying said olefin polymerization catalyst to said reactor body and means for removing polymer from said reactor body
   (B) means for externally recycling gas from the top of the fluidized bed reactor to the base of the reactor body (1), below the fluidization grid (3) comprising a dust separator (5), a heat exchanger (6,8) and a compressor (7) and
   (C) means for recycling fine particles from the dust separator (5) to the reactor body (1) wherein an improvement which reduces polymer agglomerates in the fluidized bed comprises:
   (D) the means for recycling the fine particles returns the fine particles to the upper portion of said reactor body (1) and
   (E) said means for removing polymer from said reactor body comprises at least two polymer outlets in said reactor body at different elevations above said fluidization grid but below the top of said fluidized bed for removing polymer from said bed when the reactor is in use, at least one of said polymer outlets (15), a lower polymer outlet, is at the lower portion of said reactor body (1) and at least one other of said polymer outlets (6), an upper polymer outlet, is at the upper portion of said reactor body (1) at a location at an elevation above and spaced from said lower polymer outlet fluidized bed both through said lower polymer outlet and through said upper polymer outlet; and
   (F) there are polymer receiving means for receiving polymer discharged from said polymer outlets and unidirectional control means connected to said polymer outlets and to said receiving means which permit the discharge of polymer from said polymer outlets into said polymer receiving means while preventing the flow of polymer and gases from said receiving means into said reactor body by way of said outlets.

2. Apparatus as claimed in claim 1 in which the lower and upper polymer outlets (15,16) are separated by a height of at least H/3.

3. Apparatus as claimed in claim 1 in which the position at which the fine particles are returned to the reactor body and the upper polymer outlet (16) are separated by a height of less than H/3.

4. Apparatus as claimed in claim 3 in which the position at which the fine particles are returned to the reactor body and the upper polymer outlet (16) are circumferentially separated but are at substantially the same height above the fluidization grid (3).

5. Apparatus as claimed in claim 3 in which the position at which the fine particles are returned to the reactor body is directly below the upper polymer outlet (16).

6. Apparatus as claimed in claim 1 in which the upper polymer outlet (16) is at a height higher that 0.5 H and the lower polymer outlet is at a height lower than 0.5 H.

7. Apparatus as claimed in claim 1 in which the reactor body (1) is surmounted by a disengagement chamber (2).

8. Apparatus as claimed in claim 1 in which the dust separator (5) is a cyclone.

9. Apparatus as claimed in claim 1 in which the means for recycling fine particles from the dust separator (5) to the reactor body (1) comprises a mixing device (10) capable of withdrawing the fine particles from the dust separator (5), mixing them with a carrier gas and recycling the mixture of gas and fine particles to the reactor body (1) via a reintroduction conduit (13).

10. Apparatus as claimed in claim 9 in which the mixing device (10) is an ejector-compressor.

11. Apparatus as claimed in claim 1 in which the lower polymer outlet (15) is positioned at a height above the fluidization grid (3) which less than 0.3 H.

12. Apparatus as claimed in claim 1 in which the upper polymer outlet (16) is positioned at a height above the fluidization grid which is at least 0.65 H.

13. In fluid bed reactor apparatus for catalytically polymerizing olefins in a fluidized-bed under gas medium fluidized conditions comprising:
   (A) a gas-phase fluidized-bed reactor comprising a vertical reactor body having a fluidization grid arranged in its lower end, said body defining therewithin a polymerization chamber above said grid in which the catalyzed polymerization reaction can be conducted under gas medium fluidized bed conditions, said chamber having a height above said grid of H, a catalyst bed above said grid and comprising an olefin polymerization catalyst, means for supplying an olefin containing gas to said reactor body below said grid for maintaining said bed thereabove fluidized with the base of the bed at said fluidization grid and with the top of said bed spaced from said fluidization grid by 0.7 to 0.95 H when said reactor is in use, means for supplying said olefin polymerization catalyst to said chamber and means for removing polymer from said chamber;

(B) recycling means for removing gas from the top of said chamber and recycling the last-mentioned said gas externally of said reactor body and to the base of said reactor body, below the fluidization grid and hence, through said grid to said chamber, said recycling means comprising a dust separator, a heat exchanger and a compressor; and (C) means for recycling fine particles from the dust separator to said chamber;

wherein an improvement which reduces polymer agglomerates in the fluidized bed comprises:

(D) said means for recycling the fine particles returns the fine particles to said chamber below the top of said chamber but vertically spaced above said grid by at least 0.5 H; and (E) said means for removing polymer from said chamber comprises at least two polymer outlets in said reactor body at different elevations above said fluidization grid but below the top of said fluidized bed for removing polymer from said chamber when the reactor is in use, at least one of said polymer outlets, a lower polymer outlet, is at the lower portion of said reactor body and is vertically spaced from said grid by less than 0.5 H and at least one other of said polymer outlets, an upper polymer oulet, is at the upper portion of said reactor body and vertically spaced from said lower polymer outlet and vertically spaced from said grid by more than 0.5 H for removing polymer from said fluidized bed both through said lower polymer outlet and through said upper polymer outlet; and (F) there are polymer receiving means for receiving polymer discharged from said polymer outlets and unidirectional control means connected to said polymer outlets and to said receiving means which permit the discharge of polymer from said polymer outlets into said polymer receiving means.

14. A process for gas-phase polymerization of one or more olefins in the presence of a solid catalyst based on chromium oxide, activated by heat treatment, or a catalyst system of the Ziegler-Natta type in which process a rising stream of a gas mixture containing the olefin(s) to be polymerized keeps the polyolefin particles being formed in the fluidized state in a fluidized-bed reactor comprising a reactor body (1) partially occupied by the fluidized-bed, the gas mixture leaving the fluidized-bed reactor entrains fine particles which are separated from the gas mixture in a dust separator and are recycled to the reactor body (1), the gas mixture being then cooled, compressed and recycled to the base of the reactor, and forming the recycle gas, the process being characterised in that (A) the fine particles separated in the dust separator (5) from the major part of the gas mixture leaving the reactor are recycled to the reactor body (1) and introduced to the upper portion of the reactor body (1)

and in that (B) the polymer produced is withdrawn from the reactor via at least two polymer outlets, at least one of which (15) is in the lower portion of the reactor body (1) and at least one of which (16) is in the upper portion of the reactor body (1) at a position below the top of the fluidized-bed.

15. A process claimed in claim 13 in which the ratio of the flow rate of the polymer withdrawn via the lower polymer outlet (15) to the flow rate of the polymer withdrawn via the upper flow rate is from 10:90 to 90:10.

16. A process as claimed in claim 14 in which the ratio of the height h of the fluidized-bed to the height H of the reactor body (1) above the fluidization grid (3) is from 0.7 to 0.95.

17. Use of apparatus as claimed in claim 1 to polymerize oelfins.

18. Apparatus as claimed in claim 1 in which said unidirectional control means comprises a gas lock vessel (17,18).

19. Apparatus as claimed in claim 18 in which each gas lock vessel (17,18) is connected to said polymer receiving means (23) for separating the polymer from the gas, said polymer receiving means comprising a polymer discharge conduit (24) and a gas venting conduit (25) provided with a compressor (26) for returning the gas to the means for recycling gas from the top of the fluidized bed reactor to the base of the reactor below the fluidization grid (3).

* * * * *